July 5, 1960 E. F. ROSSMAN 2,943,711
ROD SEAL FOR SHOCK ABSORBER
Filed Sept. 15, 1958

INVENTOR.
Edwin F. Rossman.
BY
D. C. Staley
His Attorney.

United States Patent Office 2,943,711
Patented July 5, 1960

2,943,711
ROD SEAL FOR SHOCK ABSORBER
Edwin F. Rossman, Dayton, Ohio, assignor to General Motors Corporation, Detroit, Mich., a corporation of Delaware
Filed Sept. 15, 1958, Ser. No. 761,101
3 Claims. (Cl. 188—100)

This invention relates to a direct acting shock absorber and particularly to a seal structure at the end of the shock absorber at which the actuating rod projects from the shock absorber cylinder.

When installing shock absorbers on equipment, it is important that the connections of the shock absorber with the equipment be properly aligned that transverse forces will be held to a minimum between the sliding parts of the shock absorber. This is particularly true of the direct acting type shock absorber wherein the actuating rod extends axially from the cylinder of the shock absorber. In shock absorbers of this type, axial misalignment of the connections on the vehicle by which the shock absorber rod is connected to the vehicle at one end and the shock absorber cylinder is connected to the vehicle at the other end, is particularly troublesome because axial misalignment of the connections on the vehicle result in a transverse thrust of the shock absorber rod relative to the shock absorber cylinder, which is particularly bad on the seal structure for the rod which cannot stand any substantial amount of transverse misalignment thrust without shortening the life of the seal and causing it to leak. It is, therefore, an object of this invention to provide a seal structure around the rod of the shock absorber at the end of the shock absorber through which the rod extends that is capable of absorbing misalignment thrust or transverse thrust, the seal structure being radially shiftable within a seal cavity provided for the seal structure so that the seal structure can align itself axially with the shock absorber rod, regardless of transverse thrust or radial thrust of the rod relative to the seal structure.

It is another object of this invention to provide a seal structure for the rod end of a direct acting shock absorber wherein the seal structure floats radially within a seal cavity provided in the shock absorber structure, the seal structure including an annular body member that is supported on the rod of the shock absorber and which is capable of moving radially with the rod of the shock absorber when misalignment transverse thrusts are applied to the rod of the shock absorber. In addition, a seal member is provided between the seal body and a wall of the seal cavity in the shock absorber body that allows the seal body to move radially relative to the body of the shock absorber when the shock absorber rod thrusts radially against the seal body.

Further objects and advantages of the present invention will be apparent from the following description, reference being had to the accompanying drawings wherein preferred embodiments of the present invention are clearly shown.

Figure 1:
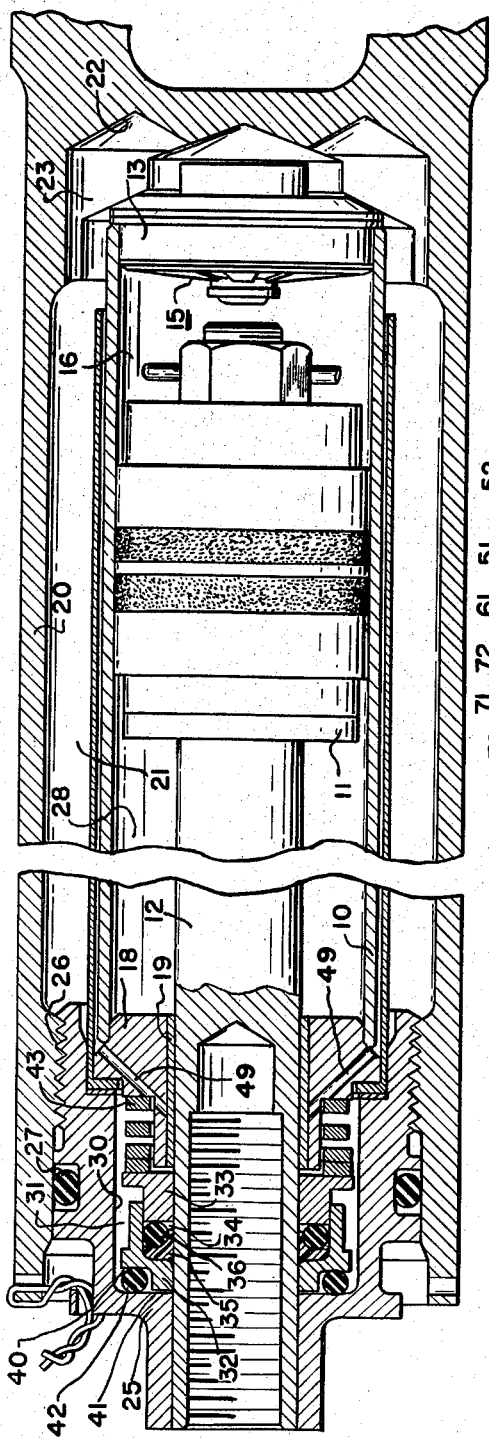
Fig. 1 is a longitudinal cross-sectional view of a direct acting shock absorber incorporating the seal structure of this invention.

As illustrated in Fig. 1, the shock absorber consists of a cylinder 10 receiving a shock absorber piston 11 that is carried on one end of the actuating rod 12, the piston 11 being positioned within the cylinder 10 for reciprocation in a conventional manner.

One end of the cylinder 11 is closed by an end wall 13 incorporating a foot valve 15 that allows hydraulic fluid to be displaced from the chamber 16 between the piston 11 and the wall 13 by movement of the piston toward the foot valve 15, and allows free flow of fluid back into the chamber 16 when the piston 11 moves away from the foot valve 15.

The opposite end of the cylinder 10 is closed by an end wall 18 that has a bearing bushing 19 that supports and slidably receives the actuating rod 12, the actuating rod 12 extending from the cylinder 10 through the end wall 18 for attachment to one part of a vehicle.

The shock absorber cylinder 10 is enclosed by a cylindrical housing 20 that is spaced from the cylinder 10 to provide an oil reservoir chamber 21. The end wall 13 containing the foot valve 15 engages the end wall 22 of the housing 20, and chamber means 23 is provided to allow hydraulic fluid to flow between the chamber 16 and the reservoir 21 in a manner previously referred to.

The housing 20 threadedly receives an end cap closure member 25, the threads 26 being provided to retain the end cap member 25 within the left-hand end of the housing 20, as shown in Fig. 1. An O ring seal 27 between the member 25 and the housing 20 prevents loss of hydraulic fluid from the reservoir chamber 21.

The end cap member 25 engages the end wall 18 of the shock absorber cylinder 10 and thereby retains the shock absorber cylinder in position between the end cap member 25 and the end wall 22 of the housing 20.

The shock absorber piston 11 is provided with suitable valving to allow hydraulic fluid to flow from the chamber 28 into the chamber 16 on left-hand movement of the piston 11, and to provide for flow of hydraulic fluid from the chamber 16 back into the chamber 28 on right-hand movement of piston 11.

From the foregoing description, it will be apparent that the shock absorber may be of a more or less conventional type, direct acting shock absorber.

The rod seal structure at the left-hand end of the shock absorber, as shown in Fig. 1, is located within a recess 30 that provides a seal chamber 31 in the end cap member 25 on the outboard side of the end wall 18.

The seal structure consists of an annular body member 32 that cooperates with an annular body member 33 to form an annular recess or chamber 34. The body members 32 and 33 are supported upon the outer periphery of the actuating rod 12.

The chamber 34 contains an annular seal ring 35 that is preferably a Teflon ring, which is a ring of polytetrafluoroethylene material made by E. I. du Pont de Nemours & Co. The polytetrafluoroethylene seal ring 35 is backed up by an annular ring 36 of elastic rubber-like material, preferably in the form of an O ring.

The seal elements just described are carried by the shock absorber rod and can move radially with the rod whenever the rod has transverse thrust applied to it. The seal body member 32 has a radially disposed annular face 40 that is in spaced parallel relation to a corresponding radially disposed annular face 41 on the end cap member 25. An annular seal ring 42 of elastic rubber-like material, preferably an O ring, is placed between these parallel faces 40 and 41 to seal thereagainst. A compression spring 43 is placed between the seal body member 32 and the end wall 18 of the shock absorber cylinder 10 to apply an axially directed pressure upon the rings 36 and 42 to effect sealing engagement with their respectively engaged surfaces. The ring 36 also applies pressure on the Teflon or polytetrafluoroethylene seal ring 35 to insure positive engagement with the ring 35 with the periphery of the rod 12 and thereby seal upon the rod.

It will be apparent from the structural arrangement of the parts of the seal just described that when transverse force is applied to the rod 12, tending to move the rod in a radial direction, the rubber-like ring 42 will allow the seal body member 32 to move in a radial direction and thereby float within the seal chamber 31 so that the seal structure will, at all times, be concentric with the rod 12 and will be relieved of all transverse thrusts. The spring member 43 acts similarly to the member 42 in allowing radial movement of the seal structure since the spring has lateral flexibility that will allow for acceptance of a considerable amount of radial movement of the member 33 relative to the end wall 18. Passages 49 in the wall 18 provide for fluid connection between chamber 31 and reservoir 21 to avoid pressure development in chamber 31, the seal being a low-pressure seal.

Figure 2:
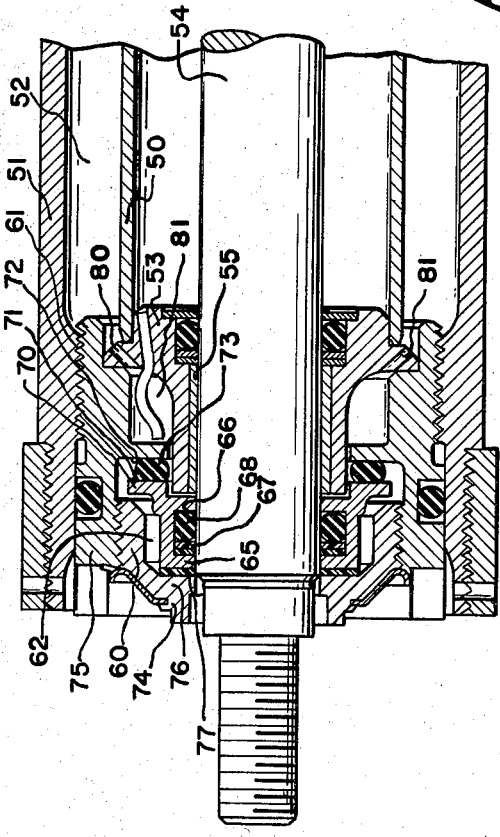
Fig. 2 is a longitudinal cross-sectional view of a portion of a shock absorber illustrating a modified construction of a seal structure for the rod of the shock absorber.

In Fig. 2 there is illustrated a slightly modified form of a seal structure, the shock absorber in Fig. 2 including a shock absorber cylinder 50 enclosed within a housing 51 that is spaced from the cylinder to provide for an oil reservoir 52. The cylinder 50 is closed by the end wall 53 and the actuating rod 54 is received by the bearing sleeve 55 in the end wall 53 and projects from the shock absorber through the end wall.

An enclosure cap 60 is threadedly received by the housing 51 by means of the thread connection 61 and is provided with a chamber 62 arranged as a seal chamber for the seal structure for the rod 54.

The seal structure consists of an annular body member 65 that has an annular recess 66 formed by the parallel flanged portions of the body member that engage the periphery of the rod 54 to support the body member 65 on the rod 54. An annular seal element 67 is received within the recess 66 in the body member 65, this seal member 67 being in the form of a two-turn spiral that is threaded through the opening in the seal body 65 before the seal body is placed on the rod 54. The seal element 67 is made of Teflon, that is a polytetrafluoroethylene material, and is backed up by an annular ring of elastic rubber-like material 68, preferably an O ring.

When the seal structure just described is placed on the rod 54, the annular ring 68 is deformed and displaced by its engagement with the rod 54 and by its confinement within the recess 66, so that it sealingly engages the periphery of the rod 54 and also applies axially directed pressure on the polytetrafluoroethylene ring 67 to insure sealing engagement of this ring with the peripheral surface of the rod 54.

The seal body 65 is provided with a radial flange 70 that has a radially disposed surface 71 positioned in parallel relation to the radially disposed surface 72 of a wall of the chamber 62. An annular ring 73 of elastic rubber-like material is placed between the parallel surfaces 71 and 72 so that when the member 74 is threaded into the member 75 with the wall 86 engaging a polytetrafluoroethylene ring 77, the ring 73 is placed under compression and deformed to a sufficient extent to provide axially directed pressure on the ring 77 and effect sealing engagement between the member 74 and the seal body 65. From the foregoing description in Fig. 2, it will be apparent that with the seal body member 65 supported upon the rod 54, it is floatingly supported between the polytetrafluoroethylene ring 77 and the ring 73 so that any radial movement of the rod 54 will carry the seal body 65 with the rod and thereby relieve the seal structure of all radially or transversely directed thrusts.

Passages 80 in the wall 53 provide for fluid connection between chamber 81 and reservoir 52 to avoid pressure development in chamber 81 and the seal chamber, the seal being a low-pressure seal.

While the embodiments of the present invention as herein disclosed constitute a preferred form, it is to be understood that other forms might be adopted.

What is claimed is as follows:

1. In a shock absorber, a rod seal for the same, comprising in combination, a cylinder having a piston reciprocable therein, said piston being attached on one end of an actuating rod extending through one end of said cylinder, said cylinder having an end wall closing the rod end of said cylinder and providing a bearing support for said rod in which it is slidable, an end cap member on said rod end of said cylinder on the outboard side of said end wall cooperating with said end wall to provide an annular seal chamber around said rod on the outboard side of said end wall through which said rod extends, an annular seal body member within said chamber and on said rod, said body member having an annular recess radially adjacent said rod and forming with said rod a seal confining chamber, a seal structure positioned within said confining chamber and consisting of an annular ring of polytetrafluoroethylene held under compression within said chamber by an annular ring of elastic rubber-like material whereby to seal upon said rod, said body member having a radially disposed planar flange surface in spaced parallel relationship to a corresponding radially disposed annular planar face on said end cap, and an elastic rubber-like seal member between said flange surface and said face sealingly engaging both faces and providing for relative movement therebetween.

2. A rod seal for a shock absorber including the combination set forth in claim 1 wherein said seal member between said flange surface and said face comprises an annular O ring.

3. In a shock absorber, a rod seal for the same, comprising in combination, a cylinder having a piston reciprocable therein, said piston being attached on one end of an actuating rod extending through one end of said cylinder, said cylinder having an end wall closing the rod end of said cylinder and providing a bearing support for said rod in which it is slidable, an end cap member on said rod end of said cylinder on the outboard side of said end wall and through which said rod extends, and cooperating with said end wall to provide an annular seal chamber around said rod on the outboard side of said end wall, an annular seal body member within said chamber and on said rod, said body member having an annular axially extending open-ended recess radially adjacent said rod, a seal structure in said recess comprising a ring of polytetrafluoroethylene engaged by a compressible annular ring of elastic rubber-like material to place compression pressure on said polytetrafluoroethylene ring, an annular compression ring carried on said rod and having an end portion slidable within said annular recess and engaging said rubber-like ring, said body member having a radially disposed planar annular face in spaced parallel relationship to a corresponding radially disposed planar annular face on said end cap, an annular resilient seal member of elastic rubber-like material between said faces and engaging both said faces and providing for radial displacement therebetween, a compression spring between said compression ring and said end wall to apply axially directed pressure on both said seal members concurrently to effect sealing engagement thereof with their respectively engaged surfaces.

References Cited in the file of this patent

UNITED STATES PATENTS

| | | |
|---|---|---|
| 621,817 | Hopkins | Mar. 28, 1899 |
| 965,688 | Claflin | July 26, 1910 |
| 1,715,483 | Walker | June 4, 1929 |
| 1,966,310 | Padgett | July 10, 1934 |
| 2,749,193 | Traub | June 5, 1956 |
| 2,857,184 | Mancusi | Oct. 21, 1958 |

FOREIGN PATENTS

| | | |
|---|---|---|
| 27,527 | Great Britain | Apr. 23, 1914 |